United States Patent [19]

Wickenberg

[11] Patent Number: 4,578,893

[45] Date of Patent: Apr. 1, 1986

[54] VERMIN TRAP

[76] Inventor: Chester Wickenberg, 1108 Greenfield La., Mt. Prospect, Ill. 60056

[21] Appl. No.: 711,196

[22] Filed: Mar. 13, 1985

[51] Int. Cl.[4] .......................................... A01M 23/30
[52] U.S. Cl. ........................................ 43/77; 43/81; 43/85
[58] Field of Search ................... 43/81, 85, 63, 61, 58, 43/77

[56] References Cited

U.S. PATENT DOCUMENTS

| 1,080,623 | 12/1913 | Brorby ................................ 43/81 |
| 1,372,663 | 3/1921 | Albers ................................ 43/61 |
| 2,222,653 | 11/1940 | Chambless ......................... 43/85 |
| 2,510,655 | 6/1950 | Price .................................. 43/77 |
| 2,518,819 | 8/1950 | Roessler ............................ 43/61 |
| 2,574,322 | 11/1951 | Fitzsimons ........................ 43/81 |
| 2,725,661 | 12/1955 | Bowman ............................ 43/61 |

Primary Examiner—Gene P. Crosby

[57] ABSTRACT

A vermin trap consisting of a one piece housing for an over-centering mechanism that is adapted to actuate a snap acting lever that in turn cooperates with a stationary bar for trapping and killing a feeding vermin. The trip lever provides an integral bait holder that upon depression over-centers the spring mechanism causing the trap to set with a snap action.

8 Claims, 10 Drawing Figures

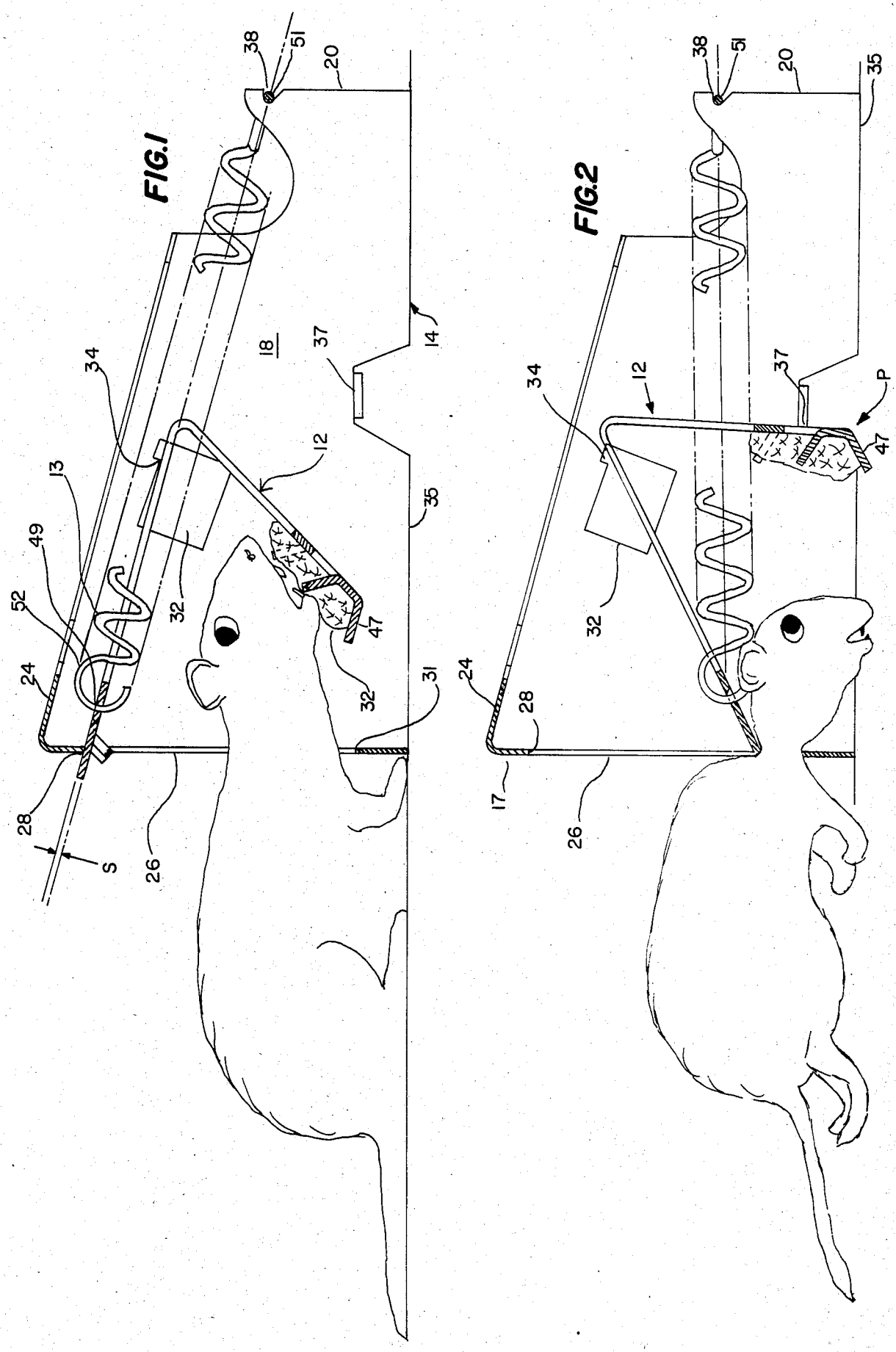

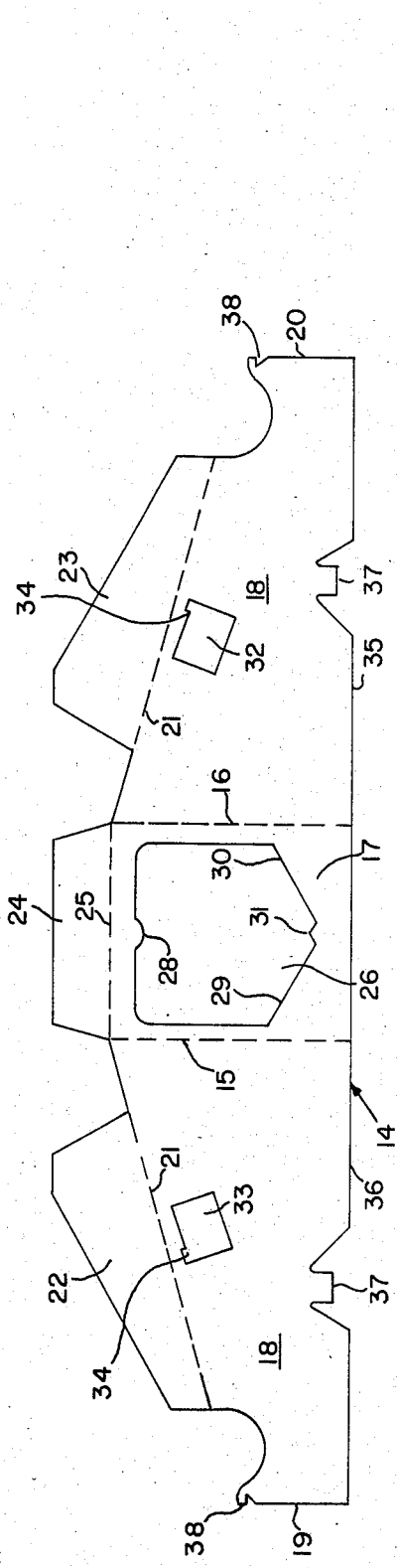
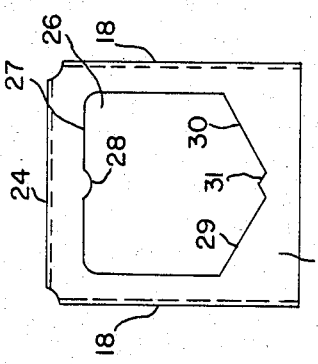
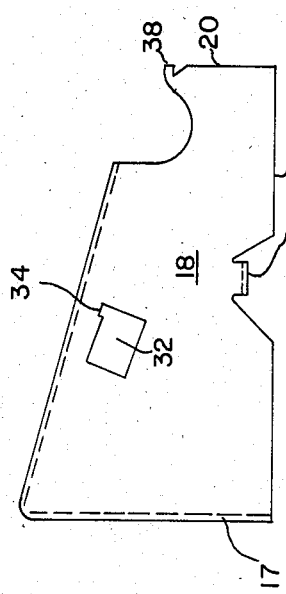
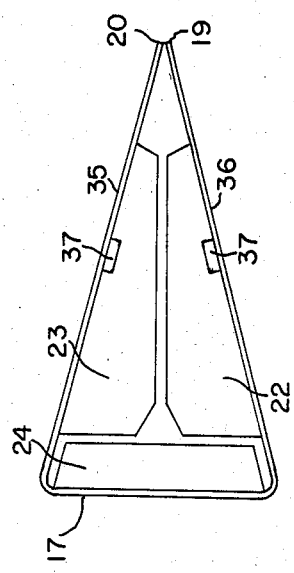
FIG. 3
FIG. 4
FIG. 5
FIG. 6

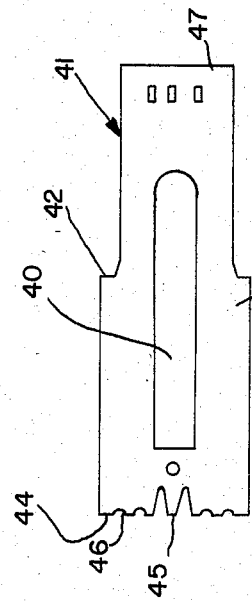
FIG.7
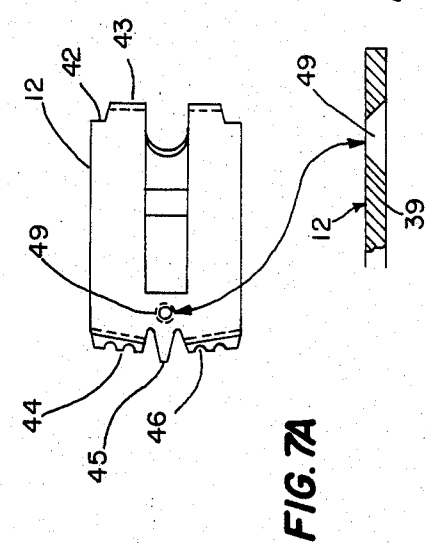
FIG.7A
FIG.7B
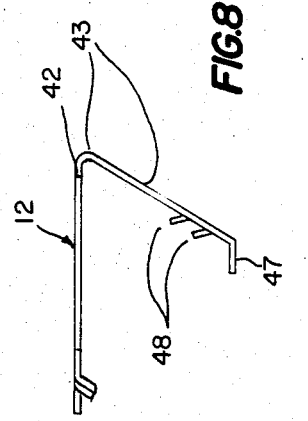
FIG.8

VERMIN TRAP

SUMMARY OF PRIOR ART AND PRESENT INVENTION

Vermin traps have been in existence throughout recorded history. They appear in great diversity of embodiments.

The most common type offered for sale today comprises a platform and, mounted thereon, a torsion spring with an enlarged loop, a primary retention lever to hold the loop in a cocked mode, and a secondary or bait lever engaged at the free end of the primary lever. By means of the double leverage the tripping force, caused be a vermin nibbling at the bait, is relatively small. However, it has well known disadvantages: It is difficult to set and, while being set, prone to inadvertent tripping often causing painful rapping of the fingers. It is unsafe for pets and infants or, at best, easily tripped by them. It sometimes catches the vermin not with a killing blow over the neck as intended, but by pinning it alive by its tail or extremities, thereby subjecting it to panic, pain and a slow death. Sometimes it fails to snap, due to excessive friction or a rough spot where the primary lever engages the secondary.

It is the purpose of this invention to provide a vermin trap that overcomes the disadvantages of aforedescribed trap. Another purpose is to provide a potentially less expensive trap, since a trap in accordance with this invention comprises just three parts in its preferred embodiment, as compared to six and eight parts for the now common type, and lends itself to a high degree of automation in its manufacture.

A further aim of this invention is to provide a trap, wherein the single finger motion required to plunder it also brings it back to the cocked (set) mode, which is not the case in the now prevalent trap.

GENERAL DESCRIPTION OF THE DRAWINGS

The invention will be best understood by reference to the accompanying drawings in which is illustrated the preferred form of construction by which the stated objects of the invention are achieved, and in which;

FIG. 1 is a detailed sectional side elevational view of the vermin trap in a set condition, FIG. 2 is a side elevational detailed view of the trap in an activated condition, FIG. 3 is a plan view of the stamped housing blank before assembly, FIG. 4 is a front elevational view of the housing blank in a semi-assembled condition, FIG. 5 is a side elevational view of the housing blank in a semi-assembled condition, FIG. 6 is a bottom view of the housing blank in a semiassembled condition, FIG. 7 is a plan view of the trip lever and bait holder blank, prior to being formed, FIG. 7a is a top plan view of the formed trip lever and bait holder, FIG. 7b is a fragmentary detailed view of the over-centering spring receiving hole formed in the trip lever, FIG. 8 is a side elevational view of the formed trip lever and bait holder.

GENERAL DESCRIPTION

As shown in FIGS. 1 and 2 the vermin trap 10 of this invention consists of three parts, a housing 11, a trip lever 12, and an over-centering coiled tension spring 13.

The housing 11 is stamped from a single blank of material 14 as shown in FIG. 3. The blank of material 14 has formed therein fold lines, 15 and 16 defining a rectangularly shaped front wall 17. Extending rearwardly from the front wall 17 are side walls 18 which terminate into free rear edges 19 and 20. Extending outwardly from the fold lines 21 are wings 22 and 23 which together form a partial top wall for the housing 11. When assembled as seen in FIG. 6, the side walls 18 converge in a rearwardly direction until their free edges 19 and 20 abut. The top wings 22 and 23, together with a lip 24, defined from the front wall 17, by a fold line 25, are bent into a common plane to form the partial top wall for the housing 11.

The front wall 17 has cut therein an opening 26. The top edge 27 defining the opening 26, is provided with a nipple 28, while the bottom edge of the opening 26 is sectioned to provide equal diverging and converging sections 29 and 30 terminating into a raised point 31.

Each side wall 18 has cut therein a substantially rectangularly shaped window 32, 33. As shown each window 32, 33 has a corresponding upper corner notched as at 34. The bottom edged 35 and 36 of each of the side walls 18 are partially notched so as to provide tabs 37 that are adapted to be bent inwardly of the housing 11 as illustrated in FIGS. 5 and 6.

The free standing rear edges 19 and 20 have their upper corners notched to form hooks 38 as shown in FIGS. 3 and 5. It is important to note that, as will be more fully described, there is a definite functional relationship between the location of the hooks 38, the corner notches 34 of the windows 32, 33 and the nipple 28 projecting into the front wall opening 26.

The second part of the trap assembly is the trip lever 12 shown in FIGS. 7 through 8a. The lever 12 is struck from a single elongated blank of material 39 and is formed with an intermediate slot 40. The width of the blank 39 is reduced mid-way throughout its length to provide a tail 41, which is bent as at 43 into a depending relation as shown in FIG. 8 thus assuming a substantial V-shape. At the points of width reduction the side edges of the trip lever 12 provide pivoting shoulders 42.

In final construction the upper forward edge 44 of the lever 12 is formed to provide a forwardly extending stop tab 45 with the remaining portion of such edge 44 being serrated to provide a series of teeth 46 angularly bent in the direction of the tail portion 41 of the lever 12. The edge of the tail 41 is bent in the same direction as are the teeth 46, so as to provide a finger tab 47. Between this tab 47 and athe end of the slot 40 the tail 41 has struck inwardly thereof a plurality of bait retainers 48. Between the stop tab 45 and the corresponding end of the slot 40 there is provided a tapered aperture 49.

The third part of the trap is an elongated coiled tension spring 50 which as shown in FIGS. 1 and 2 has one end 51 attached to the hooks 38 formed in the abutting edges 19 and 20 of the side walls 18. It should be noted that by this connection the spring 50 maintains the housing 11 in its assembled condition. The main body of the spring 50 will lie in the open area provided by the slot 40 formed in the trip lever 12 and will have its opposite end 52 hooked into the aperture 49 formed in the forward end portion of the trip lever 12.

In final assembly the trip lever 12 is placed in a barely stable position within the housing 11 by the tension spring 13.

This is accomplished by having the spring 13 acting as an overcentering mechanism. The plane of the upper portion of the trip lever 12, that portion extending between the contact of the pivotal shoulders 42 with a wall of the side windows 32,33, and the contact of the stop tab 47, with the nipple 28, provided by the top wall 27 which defines the opening 26 in the front wall 17 of the housing 10, lies slightly below, as indicated at "S" in FIG. 1, the plane of the spring 13, as it extends between its hooked engagement in the aperture 48 formed in the forward portion of the trip lever 12, and its connection to the hooks 38 provided by the rear edges 19 and 20 of the side walls 18.

This small deflection angle will cause a slight retaining force of the forward end of the trip lever 12 upon the nipple 28 thus maintaining the trip lever 12 in its set mode. This force is proportional to the sinus of the angle multiplied by the pulling force of the spring 13. The sinus of the angle, and thus the retaining force can be held quite low if the relative point locations of pivotal shoulders 42, nipple 28 and rear hook connection 38 are accurately aligned. This is readily accomplished in the act of manufacturing by stamping out the housing blank 14 as shown in FIG. 3, in one and the same tool, thus preventing potential detrimental shifts between these critical point locations. It was found in previous stages of developing this trap that the locations of these critical points, particularly the nipple 28 and the hooked end 38, could have been accomplished by having either one incorporated in a tab bent out of the housing blank, thereby simplifying its construction, but the added tolerance uncertainty of the angle to which said tabs would have to be bent was enough to decrease the accuracy of the position of the upper mode of the trip lever 12.

FIG. 1 illustrates the trap in its set mode. The trip lever 12 is held in its set position by the overcentering function of the spring 13.

FIG. 2 shows the trap in its actuated or sprung condition. This condition is brought about by the pivoting of the trip lever 12 by the vermin attempting to remove the bait. Such action causes the trip lever to pivot about the shoulders 42 causing a reactionary movement of the shoulders 42 into the upper reaches of the corner notches 34 thus extending the line of compression of the coil spring 13 below the noted pivot points causing the reverse pivoting of the trip lever 12 into the vermin trapping and killing position as shown in FIG. 2.

To reset and plunder the trapped vermin, one need only apply finger pressure "P" against the lower end of the exposed trip lever 12 in the direction shown while holding the trap in a vertical mode with the quarry pendant below the opening 26 in the front wall 17.

While I have illustrated and described the preferred form of construction and method for carrying out the invention this is capable of variation and modification without departing from the spirit of the invention. I therefore do not wish to be limited to the various details but desire to avail myself of such variations and modifications as come within the scope of the appended claims.

Having thus described my invention what I claim as new and desire to protect by Letters Patent is:

1. A feeding vermin trap comprising;
   (a) a housing having a front wall providing an open entranceway,
   (b) an integral bait supporting member and vermin capturing element pivotally supported within said housing inwardly of said entranceway, and
   (c) means within said housing comprising an overcentering mechanism for supporting said bait supporting member and said vermin capturing element into and out of a set and trapping position relative to said open entranceway provided by said housing wherein said over-centering mechanism comprises a coiled tension spring extended between a point on said housing and a point on said bait supporting member and vermin capturing element.

2. A feeding vermin trap as defined by claim 1 wherein said integral bait supporting member and capturing element comprises a V-shaped trip lever providing pivotal shoulders adapted to be movably maintained in contact with a protion of said housing and pivoted about said contact by said over-centering mehcanism into and out of a vermin trapping position.

3. A feeding vermin trap as defined by claim 1 wherein said integral bait supporting member and capturing element comprises a V-shaped trip lever providing pivotal shoulders adapted to be movably maintained in contact with a portion of said housing and pivoted about said contact by said coil spring into and out of a vermin trapping position.

4. A feeding vermin trap as defined by claim 2 wherein said V-shaped trip lever provides a bait supporting end and a vermin trapping end movable through a substantially vertical component within said housing by said over-centering mechanism with said trip lever actuated when a feeding vermin contacts said bait supporting end of said trip lever so as to pivot the same about said pivotal shoulders so that said over-centering mechanism will pivot said trip lever such that the vermin trapping member will capture the same within the said entranceway of said housing.

5. A feeding vermin trap as defined by claim 3 wherein said V-shaped tri leverl provides a bait supporting end and a vermin trapping end movable through a substantially vertical component within said housing by said coil spring with said trip lever actuated when a feeding vermin contacts said bait supporting end of the trip lever so as to pivot the same about said pivotal shoulders so the said coil spring will pivot said trip lever such that the vermin trapping member will capture the same within the said entranceway of said housing.

6. A feeding vermin trap as defined by claim 1 wherein said housing provides a means in said entranceway for resisting pivotal movement of said bait supporting member and vermin capturing element in one direction by said over-centering mechanism while permitting pivotal movement in an opposite direction within said housing.

7. A feeding vermin trap as defined by claim 2 wherein said housing includes converging side walls providing exposed edges pivotally engaging said pivotal shoulders of said V-shaped trip lever so as to provide a pivot fulcrum about which said V-shaped trip lever is pivoted by said overcentering mechanism.

8. A feeding vermin trap as defined by claim 3 wherein said housing includes converging side walls providing exposed edges pivotally engaging said pivotal shoulders of said V-shaped trip lever so as to provide a pivot fulcrum about which said V-shaped trip lever is pivoted by said coil spring.

* * * * *